United States Patent
Lee et al.

(10) Patent No.: US 10,324,274 B2
(45) Date of Patent: Jun. 18, 2019

(54) OPTICAL IMAGING SYSTEM

(71) Applicant: Samsung Electro-Mechanics Co., Ltd., Suwon-si (KR)

(72) Inventors: Tae Youn Lee, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 34 days.

(21) Appl. No.: 15/369,041

(22) Filed: Dec. 5, 2016

(65) Prior Publication Data

US 2017/0329105 A1 Nov. 16, 2017

(30) Foreign Application Priority Data

May 11, 2016 (KR) .................. 10-2016-0057505

(51) Int. Cl.
*H04N 5/222* (2006.01)
*G02B 13/00* (2006.01)
(Continued)

(52) U.S. Cl.
CPC ........... *G02B 13/0045* (2013.01); *G02B 9/60* (2013.01); *H04N 5/2253* (2013.01);
(Continued)

(58) Field of Classification Search
CPC ........ G02B 13/18; G02B 13/06; G02B 13/16; G02B 9/60; G02B 15/00–15/28; G02B 13/02; G02B 13/04; G02B 9/00–9/64; G02B 13/002–13/0045; G02B 3/04; G02B 9/62; G02B 13/005; H04N 5/2254; H04N 5/2253; H04N 5/2257; H04B 1/3833; H04M 1/0264
(Continued)

(56) References Cited

U.S. PATENT DOCUMENTS 9,405,099 B2 8/2016 Jo et al.
9,864,171 B2 * 1/2018 Hsieh .................. G02B 9/60
(Continued)

FOREIGN PATENT DOCUMENTS

CN 201378216 Y 1/2010
CN 101990647 B 7/2012
(Continued)

OTHER PUBLICATIONS

Korean Office Action dated May 23, 2017 in corresponding Korean patent application No. 10-2016-0057505. (10 pages in English and 6 pages in Korean).
(Continued)

*Primary Examiner* — William R Alexander
*Assistant Examiner* — Henry A Duong
(74) *Attorney, Agent, or Firm* — NSIP Law

(57) ABSTRACT

An optical imaging system includes a first lens, a second lens, a third lens, a fourth lens, and a fifth lens. The first lens has positive refractive power and a convex image-side surface. The second lens has negative refractive power. The third lens has negative refractive power. The fourth lens has negative refractive power and an inflection point formed on an image-side surface thereof. The fifth lens has positive refractive power and a convex image-side surface.

9 Claims, 13 Drawing Sheets

(51) Int. Cl.
*G02B 9/60* (2006.01)
*H04N 5/225* (2006.01)
*H04B 1/3827* (2015.01)
*H04M 1/02* (2006.01)

(52) U.S. Cl.
CPC ......... *H04N 5/2254* (2013.01); *H04N 5/2257* (2013.01); *H04B 1/3833* (2013.01); *H04M 1/0264* (2013.01)

(58) Field of Classification Search
USPC .................. 359/676–695, 745–795, 708–718
See application file for complete search history.

(56) References Cited

U.S. PATENT DOCUMENTS

| | | |
|---|---|---|
| 2011/0051261 A1 | 3/2011 | Ando et al. |
| 2012/0147482 A1 | 6/2012 | Tsai |
| 2013/0021678 A1 | 1/2013 | Tsai et al. |
| 2014/0204480 A1 | 7/2014 | Jo et al. |
| 2014/0300975 A1* | 10/2014 | Tsai .................. G02B 9/60 359/714 |
| 2015/0116569 A1 | 4/2015 | Mercado |
| 2016/0004043 A1 | 1/2016 | Hashimoto |

FOREIGN PATENT DOCUMENTS

| | | |
|---|---|---|
| CN | 102566017 B | 2/2014 |
| CN | 204188872 U | 3/2015 |
| JP | 2010-256608 A | 11/2010 |
| JP | 2012-194597 A | 10/2012 |
| JP | 2014-44443 A | 3/2014 |
| JP | 2014-89277 A | 5/2014 |
| JP | 2015-165338 A | 9/2015 |
| KR | 10-2014-0094334 A | 7/2014 |
| KR | 10-2016-0016931 A | 2/2016 |
| TW | 201430376 A | 8/2014 |
| TW | 201523014 A | 10/2014 |
| WO | WO 2015/001440 A1 | 1/2015 |
| WO | WO 2015/065730 A1 | 5/2015 |

OTHER PUBLICATIONS

Korean Office Action dated Nov. 30, 2017 in corresponding Korean patent application No. 10-2016-0057505 (7 pages in English and 5 pages in Korean).
Taiwanese Office Action dated Jan. 18, 2018 in Taiwanese Application No. 105140735 (5 pages in English, 5 pages in Taiwanese).
Chinese Office Action dated Mar. 19, 2019 in corresponding Chinese Patent Application No. 201710001495.3 (8 pages in English, 6 pages in Chinese).

* cited by examiner

| FIRST EXAMPLE |||||||
|---|---|---|---|---|---|---|
| Θ (HFOV) = | 23.32 | f = | 6.747 | TL = | 5.931 | |
| SURFACE NUMBER | | RADIUS OF CURVATURE | THICKNESS/ DISTANCE | INDEX OF REFRACTION | ABBE NUMBER | FOCAL LENGTH |
| S1 | FIRST LENS | 1.5200 | 0.9980 | 1.544 | 56.090 | 2.825 |
| S2 | | 107.44 | 0.0530 | | | |
| S3 | SECOND LENS | 10.520 | 0.2200 | 1.651 | 21.500 | −5.446 |
| S4 | | 2.6300 | 0.1760 | | | |
| STOP | | infinity | 0.2100 | | | |
| S5 | THIRD LENS | 29.400 | 0.2500 | 1.544 | 56.090 | −12.094 |
| S6 | | 5.3600 | 1.6540 | | | |
| S7 | FOURTH LENS | −7.8300 | 0.5070 | 1.544 | 56.090 | −7.251 |
| S8 | | 8.1300 | 0.2300 | | | |
| S9 | FIFTH LENS | −9.2700 | 0.7500 | 1.651 | 21.500 | 22.750 |
| S10 | | −5.8800 | 0.0500 | | | |
| S11 | FILTER | infinity | 0.2100 | 1.517 | 64.200 | |
| S12 | | infinity | 0.6230 | | | |
| IMAGING PLANE | | infinity | | | | |

FIG. 3

| | K | A | B | C | D | E | F | G |
|---|---|---|---|---|---|---|---|---|
| S1 | 0.00000 | -7.36960E-05 | 1.38163E-03 | -6.83545E-04 | 2.43580E-04 | -3.09661E-04 | | |
| S2 | 0.00000 | 3.88371E-02 | -2.22787E-02 | 1.72569E-02 | -2.78204E-03 | -1.45167E-03 | | |
| S3 | 0.00000 | 1.11550E-02 | 4.11993E-02 | 5.94224E-04 | 8.06926E-03 | -9.21457E-03 | | |
| S4 | 0.00000 | 1.90025E-02 | 1.22130E-01 | 9.07221E-02 | -9.91886E-02 | 1.61096E-01 | | |
| S5 | 99.00000 | 1.25881E-01 | 3.96362E-02 | 5.62647E-02 | -1.46311E-02 | -9.71809E-03 | 9.00908E-03 | 9.10348E-03 |
| S6 | 35.18308 | 1.32094E-01 | 4.28120E-01 | -6.05140E-02 | 1.77309E-02 | 4.32150E-02 | 6.12075E-03 | -1.25794E-01 |
| S7 | 12.31822 | -5.33692E-02 | 5.19002E-03 | 6.81660E-04 | 4.57587E-04 | 5.76493E-05 | -5.05412E-06 | -6.50885E-06 |
| S8 | -3.79102 | -4.93549E-02 | 1.01068E-03 | 5.33915E-04 | 3.30389E-05 | 1.00965E-05 | -1.15957E-06 | -1.53806E-06 |
| S9 | 0.00000 | -2.72694E-02 | 3.17962E-03 | -8.59728E-05 | -4.22227E-06 | 4.84665E-06 | 6.09593E-07 | -3.04095E-07 |
| S10 | 0.00000 | -4.10147E-02 | 8.61506E-03 | -4.78122E-04 | -1.39218E-04 | -5.49500E-06 | 4.45951E-06 | |

FIG. 4

| SECOND EXAMPLE | | | | | |
|---|---|---|---|---|---|
| Θ (HFOV) = 23.32 | | f = 6.750 | TL = 5.933 | | |
| SURFACE NUMBER | | RADIUS OF CURVATURE | THICKNESS/ DISTANCE | INDEX OF REFRACTION | ABBE NUMBER | FOCAL LENGTH |
| S1 | FIRST LENS | 1.7100 | 1.0360 | 1.544 | 56.090 | 2.820 |
| S2 | | -12.250 | 0.1000 | | | |
| S3 | SECOND LENS | 46.370 | 0.3000 | 1.650 | 21.460 | -7.250 |
| S4 | | 4.3100 | 0.1830 | | | |
| STOP | | infinity | 0.1130 | | | |
| S5 | THIRD LENS | -104.90 | 0.3000 | 1.650 | 21.460 | -7.940 |
| S6 | | 5.5000 | 1.4110 | | | |
| S7 | FOURTH LENS | -20.84 | 0.3000 | 1.544 | 56.090 | -5.520 |
| S8 | | 3.5500 | 0.4120 | | | |
| S9 | FIFTH LENS | -21.910 | 0.8750 | 1.650 | 21.460 | 17.460 |
| S10 | | -7.6500 | 0.1000 | | | |
| S11 | FILTER | infinity | 0.2100 | 1.523 | 39.070 | |
| S12 | | infinity | 0.5930 | | | |
| IMAGING PLANE | | infinity | | | | |

FIG. 7

| | K | A | B | C | D | E | F | G | H |
|---|---|---|---|---|---|---|---|---|---|
| S1 | -0.39247 | 5.56050E-03 | -5.23795E-03 | 2.79732E-02 | -6.35546E-02 | 8.54926E-02 | -7.15767E-02 | 3.62009E-02 | -1.02153E-02 |
| S2 | 0.00000 | 7.48950E-02 | -4.22197E-02 | -6.58746E-02 | 1.54114E-01 | -1.72440E-01 | 1.28857E-01 | -6.44413E-02 | 1.91194E-02 |
| S3 | 786.78991 | 5.72100E-02 | -1.75186E-02 | -1.84770E-01 | 3.35395E-01 | -2.86838E-01 | 1.42943E-01 | -4.21364E-02 | 6.77274E-03 |
| S4 | -10.81298 | -1.16596E-02 | 1.31286E-01 | -7.88657E-01 | 2.08606E+00 | -3.74578E+00 | 4.47527E+00 | -3.33822E+00 | 1.36700E+00 |
| S5 | 0.00000 | 8.91189E-02 | 5.92183E-03 | -7.21259E-02 | -4.28767E-01 | 1.70785E+00 | -2.91189E+00 | 2.53586E+00 | -1.08245E+00 |
| S6 | 0.00000 | 1.64030E-01 | -4.23994E-02 | 1.36990E+00 | -1.24940E+00 | 6.23050E+01 | -1.86828E+02 | 3.34767E+02 | -3.30048E+02 |
| S7 | 0.00000 | -1.19996E-01 | -1.35252E-01 | 4.22983E-01 | -6.74778E-01 | 6.48774E-01 | -3.77755E-01 | 1.24647E-01 | -2.00347E-02 |
| S8 | 0.00000 | -1.02776E-01 | -3.19223E-01 | 8.15351E-02 | -7.44744E-02 | 3.59703E-02 | -9.04824E-03 | 6.19412E-04 | 1.88690E-04 |
| S9 | 59.50848 | -1.48636E-02 | 5.52630E-02 | -9.45553E-02 | 7.94146E-02 | -3.91437E-02 | 1.16603E-02 | -2.05236E-03 | 1.96494E-04 |
| S10 | 0.00000 | -5.95900E-02 | 5.73779E-02 | -4.94894E-02 | 2.47352E-02 | 7.30456E-03 | 1.27967E-03 | -1.27204E-04 | 6.40301E-06 |

FIG. 8

| THIRD EXAMPLE | | | | | |
|---|---|---|---|---|---|
| Θ (HFOV) = 23.51 | | f = 6.757 | TL = 5.939 | | |
| SURFACE NUMBER | | RADIUS OF CURVATURE | THICKNESS/ DISTANCE | INDEX OF REFRACTION | ABBE NUMBER | FOCAL LENGTH |
| S1 | FIRST LENS | 1.5700 | 0.9930 | 1.544 | 56.090 | 2.870 |
| S2 | | -139.71 | 0.1440 | | | |
| S3 | SECOND LENS | 7.9700 | 0.2640 | 1.651 | 21.500 | -4.300 |
| S4 | | 2.0400 | 0.1760 | | | |
| STOP | | infinity | 0.3700 | | | |
| S5 | THIRD LENS | 8.5900 | 0.2760 | 1.544 | 56.090 | -27.450 |
| S6 | | 5.3900 | 1.3180 | | | |
| S7 | FOURTH LENS | -7.3100 | 0.3840 | 1.544 | 56.090 | -6.350 |
| S8 | | 6.6800 | 0.1330 | | | |
| S9 | FIFTH LENS | 1784.3 | 0.8510 | 1.651 | 21.500 | 19.280 |
| S10 | | -12.640 | 0.0600 | | | |
| S11 | FILTER | infinity | 0.2100 | 1.520 | 64.200 | |
| S12 | | infinity | 0.7600 | | | |
| IMAGING PLANE | | infinity | | | | |

FIG. 11

| | K | A | B | C | D | E | F | G |
|---|---|---|---|---|---|---|---|---|
| S1 | 0.00000 | -5.52533E-04 | 1.40367E-03 | -7.86621E-04 | 1.74426E-04 | 9.18686E-05 | | |
| S2 | 0.00000 | 4.25047E-02 | -2.38705E-02 | 1.38774E-02 | -5.75392E-03 | 1.21913E-03 | | |
| S3 | 0.00000 | -3.27667E-03 | 2.35387E-02 | -1.50625E-02 | 3.80109E-03 | 1.28811E-03 | | |
| S4 | 0.00000 | -1.70446E-02 | 8.47610E-02 | 4.90801E-02 | -1.49382E-01 | 1.61096E-01 | | |
| S5 | -94.14555 | 6.87607E-02 | -1.12296E-02 | 4.27120E-02 | -3.83052E-02 | -9.71810E-03 | 9.00910E-03 | 9.10350E-03 |
| S6 | 33.86602 | 6.02069E-02 | 4.20415E-02 | 9.09648E-02 | 2.29319E-02 | 4.32150E-02 | 6.12076E-03 | -1.25794E-01 |
| S7 | 2.31788 | -4.75325E-02 | 6.94424E-03 | 8.48107E-04 | 3.75255E-04 | 2.19577E-05 | -9.89039E-06 | -9.90304E-06 |
| S8 | 3.45625 | -4.48564E-02 | -1.79537E-03 | 4.64230E-04 | -4.48280E-05 | 2.46657E-06 | 1.77061E-06 | -6.32234E-07 |
| S9 | 0.00000 | -2.71468E-02 | 3.51914E-02 | -1.90006E-03 | -2.12109E-05 | 5.20753E-06 | 1.58444E-06 | 1.84191E-08 |
| S10 | 0.00000 | -4.49486E-02 | 9.36159E-03 | -2.69404E-04 | -1.19299E-04 | -7.55376E-06 | 3.40473E-06 | |

FIG. 12

OPTICAL IMAGING SYSTEM

CROSS-REFERENCE TO RELATED APPLICATION

This application claims the benefit under 35 USC 119(a) of Korean Patent Application No. 10-2016-0057505, filed on May 11, 2016 in the Korean Intellectual Property Office, the entire disclosure of which is incorporated herein by reference for all purposes.

BACKGROUND

1. Field

The following description relates to an optical imaging system capable of long-distance imaging.

2. Description of Related Art

In recent years, as mobile communication devices such as a mobile communication terminal, a PDA, and a smart phone improve in an image quantity reproduction, various types of additional functions are provided in addition to a basic communication function.

Among them, a camera module is essentially mounted in the mobile communication devices to photograph or transmit an image.

In particular, in recent years, a decrease in size, a decrease in weight, and a decrease in cost are needed with respect to the optical system mounted in the camera module. Telescopic optical systems capable of long-distance imaging are commonly fairly large in size. For example, large telescopic optical systems have a ratio of an overall length (TL) to an overall focal length (f) to be greater than or equal to 1. Thus, it is difficult to mount telescopic optical systems in small electronic products such as mobile terminals.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples provide an optical imaging system configured for long-distance imaging while being mounted in a small terminal.

In accordance with an example, there is provided an optical imaging system, including: a first lens may include positive refractive power and a convex image-side surface; a second lens may include negative refractive power; a third lens may include negative refractive power; a fourth lens may include negative refractive power and an inflection point formed on an image-side surface thereof; and a fifth lens may include positive refractive power and a convex image-side surface.

The first lens may include a convex object-side surface.
The second lens may include a convex object-side surface.
The second lens may include a concave image-side surface.
The third lens may include a concave object-side surface.
The third lens may include a convex object-side surface.
The fourth lens may include a concave object-side surface and a concave image-side surface.
The fifth lens may include a concave object-side surface.
The fifth lens may include a convex object-side surface.

$TL/f<1.0$ may be satisfied, in which TL may be a distance from an object-side surface of the first lens to an imaging plane, and f may be an overall focal length of the optical imaging system.

In accordance with another example, there is provided an optical imaging system, including: a first lens may include refractive power; a second lens may include refractive power; a third lens may include negative refractive power and a convex object-side surface; a fourth lens may include a concave object-side surface and a concave image-side surface; and a fifth lens may include refractive power.

The fifth lens may include a convex image-side surface.
$0.15<R1/<1.5$ may be satisfied, in which R1 is a radius of curvature of an object-side surface of the first lens, and f is an overall focal length of the optical imaging system.

$-3.5<f/f2<-0.5$ may be satisfied, in which f is an overall focal length of the optical imaging system, and f2 is a focal length of the second lens.

$0.1<d34/TL<0.7$ may be satisfied, in which d34 is a distance from an image-side surface of the third lens to an object-side surface of the fourth lens, and TL is a distance from an object-side surface of the first lens to an imaging plane.

$1.60<Nd5<1.75$ may be satisfied, in which Nd5 is a refractive index of the fifth lens.

$0.3<\tan \theta<0.5$ may be satisfied, in which $\theta$ is equal to half a field of view of the optical imaging system.

In accordance with a further example, there is provided an optical imaging system, including: a first lens may include refractive power and a convex object-side surface; a second lens may include negative refractive power and a convex object-side surface; a third lens may include negative refractive power and a concave image-side surface; a fourth lens may include negative refractive power, a concave object-side surface, and a concave image-side surface; and a fifth lens may include refractive power and a convex image-side surface.

A refractive index of the first lens and the fourth lens may be less than 1.6.

A refractive index of the second lens and the fifth lens may be equal to or greater than 1.6.

A refractive index of the third lens is between 1.5 and 1.7.

$TL/f<1.0$ may be satisfied, in which TL may be a distance from the object-side surface of the first lens to an imaging plane, and f may be an overall focal length of the optical imaging system.

$0.15<R1/f<1.5$ may be satisfied, in which R1 may be a radius of curvature of the object-side surface of the first lens, and f may be an overall focal length of the optical imaging system.

$-3.5<f/f2<-0.5$ may be satisfied, in which f may be an overall focal length of the optical imaging system, and f2 may be a focal length of the second lens.

$0.1<d34/TL<0.7$ may be satisfied, in which d34 may be a distance from the image-side surface of the third lens to the object-side surface of the fourth lens, and TL may be a distance from the object-side surface of the first lens to an imaging plane.

$1.60<Nd5<1.75$ may be satisfied, in which Nd5 may be a refractive index of the fifth lens.

$0.3<\tan \theta<0.5$ may be satisfied, in which $\theta$ may be equal to half a field of view of the optical imaging system.

In accordance with an example, there is provided a mobile terminal, including: a first camera module may include a first optical imaging system configured to capture an image of a subject at a close distance; and a second camera module may include a second optical imaging system configured to capture an image of the subject at a long distance, wherein the second optical imaging system may include a first lens may include refractive power and a convex object-side surface, a second lens may include refractive power and a convex object-side surface, a third lens may include refractive power and a concave image-side surface, a fourth lens may include refractive power, a concave object-side surface, and a concave image-side surface, and a fifth lens may include refractive power and a convex image-side surface.

The first optical imaging system may include four or more lenses.

The first optical imaging system has a wide field of view of 50 degrees or higher.

The second optical imaging system has a narrow field of view of 40 degrees or below.

An overall length of the first optical imaging system may be substantially same as an overall length of the second optical imaging system.

A ratio of the overall length of the second optical imaging system to the overall length of the first optical imaging system range from 0.8 to 1.0.

A ratio of the overall length of the second optical imaging system to a height of the mobile terminal may be equal to or less than 0.8.

Other features and aspects will be apparent from the following detailed description, the drawings, and the claims.

BRIEF DESCRIPTION OF THE DRAWINGS

FIG. 3 is a table listing characteristics of lenses of the optical imaging system illustrated in FIG. 1.

FIG. 4 is a table listing aspherical characteristics of the optical imaging system illustrated in FIG. 1.

FIG. 7 is a table listing characteristics of lenses of the optical imaging system illustrated in FIG. 5.

FIG. 8 is a table listing aspherical characteristics of the optical imaging system illustrated in FIG. 5.

FIG. 11 is a table listing characteristics of lenses of the optical imaging system illustrated in FIG. 9.

FIG. 12 is a table listing aspherical characteristics of the optical imaging system illustrated in FIG. 9.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
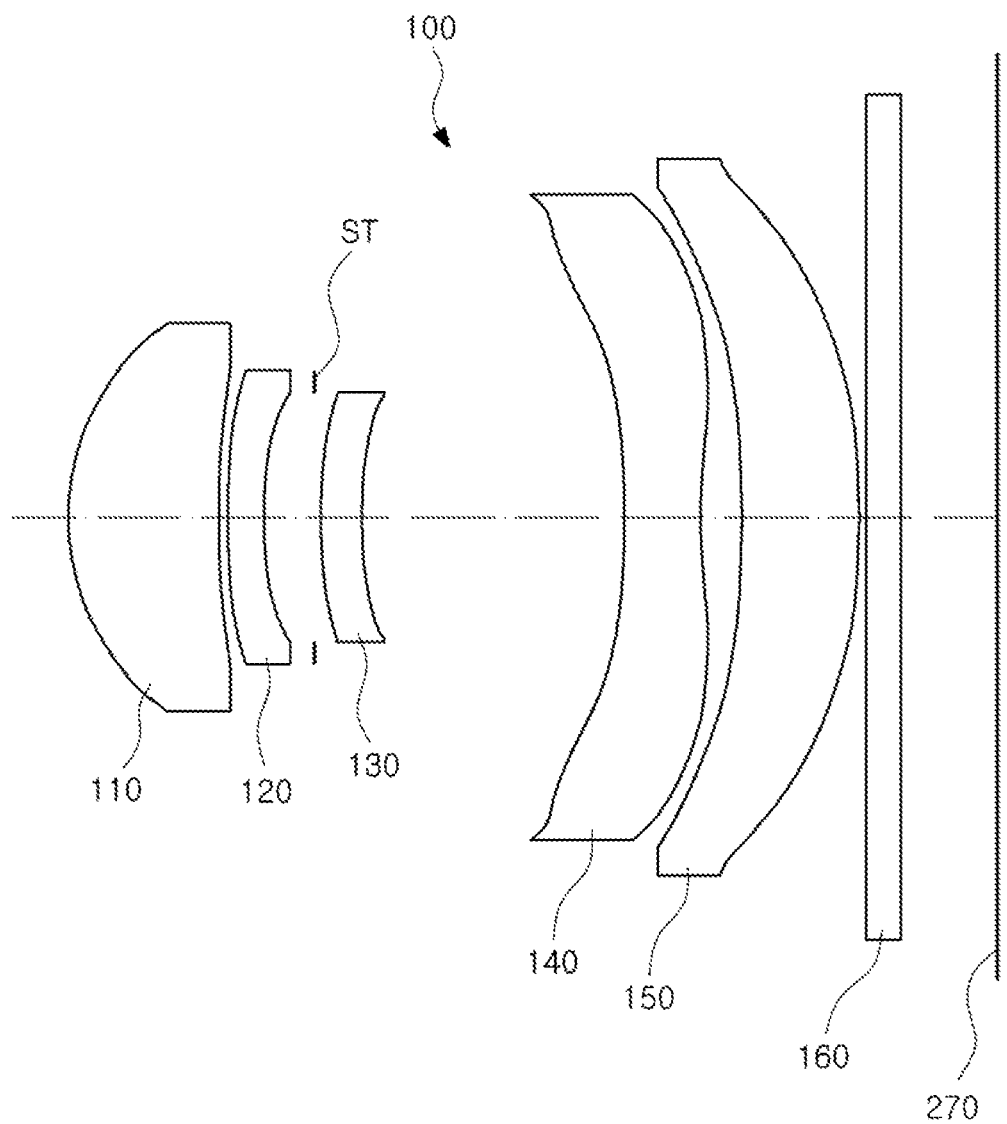
FIG. 1 is a view of an optical imaging system, according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In accordance with an embodiment, a first lens refers to a lens closest to an object or a subject from which an image is captured. A fifth lens is a lens closest to an imaging plane or an image sensor. In an embodiment, radii of curvature, thicknesses, refractive indexes (TL), and a half of a diagonal length of the imaging plane (Y), and focal lengths of respective lens are also indicated in millimeters (mm). A person skilled in the relevant art will appreciate that other units of measurement may be used. Further, in the present specification, all radii of curvature, thicknesses, OALs (optical axis distances from the first surface of the first lens to the image sensor (OALs), a distance on the optical axis between the stop and the image sensor (SLs), image heights (IMGHs) (image heights), and back focus lengths (BFLs) (back focus lengths) of the lenses, an overall focal length of an optical system, and a focal length of each lens are indicated in millimeters (mm). Further, thicknesses of lenses, gaps between the lenses, OALs, TLs, and SLs are distances measured based on an optical axis of the lenses.

Further, concerning shapes of the lenses, such shapes are represented in relation to optical axes of the lenses. A surface of a lens being convex means that an optical axis portion of a corresponding surface is convex, and a surface of a lens being concave means that an optical axis portion of a corresponding surface is concave. Therefore, in a configuration in which one surface of a lens is described as being convex, an edge portion of the lens may be concave. Likewise, in a configuration in which one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat.

In addition, in an embodiment, thicknesses and radii of curvatures of lenses are measured in relation to optical axes of the corresponding lenses.

An optical imaging system includes an optical system having a plurality of lenses. For example, the optical imaging system may include five lenses having refractive power. In another example, the lens module may include from four lenses up to six lenses without departing from the scope of the embodiments herein described. In accordance with an illustrative example, the embodiments described of the optical system include five lenses with a refractive power. However, a person of ordinary skill in the relevant art will appreciate that the number of lenses in the optical system may vary, for example, between two to six lenses, while achieving the various results and benefits described hereinbelow. Also, although each lens is described with a particular refractive power, a different refractive power for at least one of the lenses may be used to achieve the intended result.

Furthermore, the optical imaging system does not include only lenses having refractive power. For example, the optical system may include a stop controlling an amount of light. The optical imaging system also includes an image sensor, for example, an imaging device, converting an image of a subject received thereby into an electrical signal. In addition, the optical imaging system further includes an infrared cut-off filter filtering infrared light.

First to fifth lenses are formed of materials having different refractive indexes different from that of air. For example, the first to fifth lenses may be formed of plastic or glass or a polyurethane material. At least one of the first to fifth lenses has an aspherical shape. For example, at least one surface of the first to the fifth lenses may be aspherical. Here, an aspherical surface of each lens is represented by the following Equation 1:

$$Z = \frac{cr^2}{1 + \sqrt{1-(1+k)c^2r^2}} + Ar^4 + Br^6 + Cr^8 + Dr^{10} + Er^{12} + Fr^{14} + Gr^{16} + Hr^{18} + Jr^{20}$$

Here, c is an inverse of a radius of curvature of the lens, k is a conic constant, r is a distance from a certain point on an aspherical surface of the lens to an optical axis, A to J are aspherical constants, and Z (or SAG) is a distance between the certain point on the aspherical surface of the lens at the distance r and a tangential plane meeting the apex of the aspherical surface of the lens.

The first to the fifth lenses forming the optical imaging system are described below.

The first lens has refractive power. For example, the first lens has a positive refractive power.

One surface of the first lens is convex. For example, an object-side surface of the first lens is convex.

The first lens has an aspherical surface. For example, both surfaces of the first lens is aspherical. The first lens is formed of a material having high light transmissivity and excellent workability. For example, the first lens may be formed of plastic. However, a material of the first lens is not limited to plastic. For example, the first lens is formed of glass. The first lens has a certain refractive index. For example, a refractive index of the first lens may be less than 1.6.

The first lens may have a certain focal length. For example, a focal length of the first lens is determined to be from 2.6 mm to 3.0 mm.

The second lens has refractive power. For example, the second lens has a negative refractive power.

One surface of the second lens is convex. For example, an object-side surface of the second lens may be convex.

The second lens has an aspherical surface. For example, both surfaces of the second lens are aspherical. The second lens is formed of a material having high light transmissivity and excellent workability. For example, the second lens is formed of plastic. However, a material of the second lens is not limited to plastic. For example, the second lens is formed of glass. The second lens has a refractive index higher than that of the first lens. For example, a refractive index of the second lens is equal to or greater than 1.6.

The second lens has a certain focal length. For example, a focal length of the second lens is determined to be from −9.0 mm to −3.0 mm.

The third lens has refractive power. For example, the third lens has a negative refractive power.

One surface of the third lens is concave. For example, an image-side surface of the third lens is concave.

The third lens has an aspherical surface. For example, both surfaces of the third lens are aspherical. The third lens is formed of a material having high light transmissivity and excellent workability. For example, the third lens is formed of plastic. However, a material of the third lens is not limited to plastic. For example, the third lens may be formed of glass. The third lens has a certain refractive index. For example, a refractive index of the third lens may be selected from 1.5 to 1.7.

The third lens has a certain focal length. For example, a focal length of the third lens is from −30.0 mm to −6.0 mm.

The fourth lens has refractive power. For example, the fourth lens has a negative refractive power.

The fourth lens has a concave object-side surface and a concave image-side surface.

The fourth lens has an aspherical surface. For example, both surfaces of the fourth lens are aspherical. The fourth lens is formed of a material having high light transmissivity and excellent workability. For example, the fourth lens is formed of plastic. However, a material of the fourth lens is not limited to plastic. For example, the fourth lens may be formed of glass. The fourth lens has substantially the same refractive index as the first lens. For example, a refractive index of the fourth lens may be less than 1.6.

The fourth lens has an inflection point. For example, the fourth lens may have at least one inflection point formed on an image-side surface thereof. However, a location of the at least one inflection point is not limited to the image-side surface of the fourth lens. For example, the fourth lens may also have at least one inflection point formed on an object-side surface thereof.

The fourth lens has a certain focal length. For example, a focal length of the fourth lens may be determined to be from −9.0 mm to −4.0 mm.

The fifth lens has refractive power. For example, the fifth lens has a positive refractive power.

One surface of the fifth lens is convex. For example, an image-side surface of the fifth lens is convex.

The fifth lens includes an aspherical surface. For example, both surfaces of the fifth lens may be aspherical. The fifth lens is formed of a material having high light transmissivity and excellent workability. For example, the fifth lens is formed of plastic. However, a material of the fifth lens is not limited to plastic. For example, the fifth lens may be formed of glass. The fifth lens has a refractive index higher than that of the first lens. For example, a refractive index of the fifth lens may be equal to or greater than 1.6.

The fifth lens has a certain focal length. For example, a focal length of the fifth lens may be determined to be from 16.0 mm to 24.0 mm.

In accordance with other embodiments, each or at least one of the first through fifth lenses may be configured in an opposite refractive power from the configuration described above. For example, in an alternative configuration, the first lens has a negative refractive power, the second lens has a positive refractive power, the third lens has a positive refractive power, the fourth lens has a positive refractive power, and the fifth lens has a negative refractive power.

A configuration other than the first to the fifth lenses is described below.

The optical imaging system includes an image sensor. A surface of the image sensor forms an imaging plane. The imaging plane may be substantially rectangular. However, the imaging plane is not limited to having a rectangular shape. For example, the imaging plane may be square. The image sensor is configured to realize high resolution. For example, a unit size of pixels forming the image sensor may be equal to or less than 1.12 µm.

The optical imaging system includes a filter. For example, the optical imaging system may include an infrared cut-off filter filtering infrared light. The infrared cut-off filter is formed of glass. For example, the infrared cut-off filter is formed of transparent glass having an infrared cut-off film formed thereon. A refractive index of the infrared cut-off filter is substantially equal to or greater than 1.5. The infrared cut-off filter configured as described above is disposed between the fifth lens and the image sensor.

The optical imaging system includes a stop configured to adjust an amount of light. For example, the stop may be disposed between lenses to adjust an amount of light incident to the image sensor.

The optical imaging system satisfies the following Conditional Expressions:

$0.7 < TL/f < 1.0$ [Conditional Expression 1]

$0.15 < R1/f < 1.5$ [Conditional Expression 2]

$-3.5 < f/f2 < -0.5$ [Conditional Expression 3]

$0.1 < d34/TL < 0.7$ [Conditional Expression 4]

$1.60 < Nd5 < 1.75$ [Conditional Expression 5]

$0.3 < \tan\theta < 0.5$ [Conditional Expression 6]

In the Conditional Expressions 1 to 6, f is an overall focal length of the optical imaging system, θ is equal to half a field of view of the optical imaging system, R1 is a radius of curvature of an object-side surface of the first lens, R2 is a radius of curvature of an image-side surface of the first lens, f1 is a focal length of the first lens, f2 is a focal length of the second lens, d34 is a distance from an image-side surface of the third lens to an object-side surface of the fourth lens, and Nd5 is a refractive index of the fifth lens.

Conditional Expression 1 is within a numerical range defined as a telephoto ratio of the optical imaging system. For example, when a value obtained from the optical imaging system is outside of a lower limit obtained from Conditional Expression 1, telescopic properties thereof increase, and thus, a field of view thereof decreases, and when a value obtained from the optical imaging system is outside of an upper limit obtained from Conditional Expression 1, the field of view increases, and thus, the telescopic properties decrease.

Conditional Expression 2 is within a numerical range defined to improve telescopic properties and moldability of the first lens. For example, when a value obtained from the first lens is outside of a lower limit obtained from Conditional Expression 2, the first lens increases the telescopic properties of the optical imaging system, but it may be difficult to form the first lens by injection molding. For example, when a value obtained from the first lens is outside of an upper limit obtained from Conditional Expression 2, the first lens has increased longitudinal spherical aberration and a reduced focal length, and thus, it may be difficult to configure a telescopic optical system.

Conditional Expression 3 is within a numerical range defined to realize a high-resolution optical imaging system. For example, when a value obtained from the second lens is outside of an upper or lower limit obtained from Conditional Expression 3, the second lens causes a degradation of an image, as well as increasing astigmatic aberration of the optical imaging system.

Conditional Expression 4 is within a numerical range defined to realize telescopic properties and a small optical system. For example, when a value obtained from the optical imaging system is outside of a lower limit obtained from Conditional Expression 4, the optical imaging system has a reduced overall focal length, and thus, it may be difficult to configure a telescopic optical system. For example, when a value obtained from the optical imaging system is outside of an upper limit obtained from Conditional Expression 4, the optical imaging system has an increased total length (TL), and thus, it may be difficult to configure a small optical system.

Conditional Expression 5 is provided to select a material of the fifth lens. For example, the fifth lens satisfying a numerical range of Conditional Expression 5 is advantageous for correcting longitudinal chromatic aberration, magnification, and chromatic aberration, and for correcting astigmatic aberration.

Next, optical imaging systems, according to various examples, are described.

Referring to FIG. 1, an optical imaging system, according to a first example, is described.

An optical imaging system 100 includes a plurality of lenses having refractive power. For example, the optical imaging system 100 includes a first lens 110, a second lens 120, a third lens 130, a fourth lens 140, and a fifth lens 150.

In the first example, the first lens 110 has positive refractive power, and has a convex object-side surface and a concave image-side surface. The second lens 120 has negative refractive power, and has a convex object-side surface and a concave image-side surface. The third lens 130 has negative refractive power, and has a convex object-side surface and a concave image-side surface. The fourth lens 140 has negative refractive power, and a concave object-side surface and a concave image-side surface. In addition, inflection points are formed on the concave object-side surface and the concave image-side surface of the fourth lens 140. The fifth lens 150 has positive refractive power, and has a concave object-side surface and a convex image-side surface.

The optical imaging system 100 includes a stop ST, a filter 160, and an image sensor 170.

The stop ST is disposed between the second lens 120 and the third lens 130. The filter 160 is disposed between the fifth lens 150 and the image sensor 170.

Figure 2:
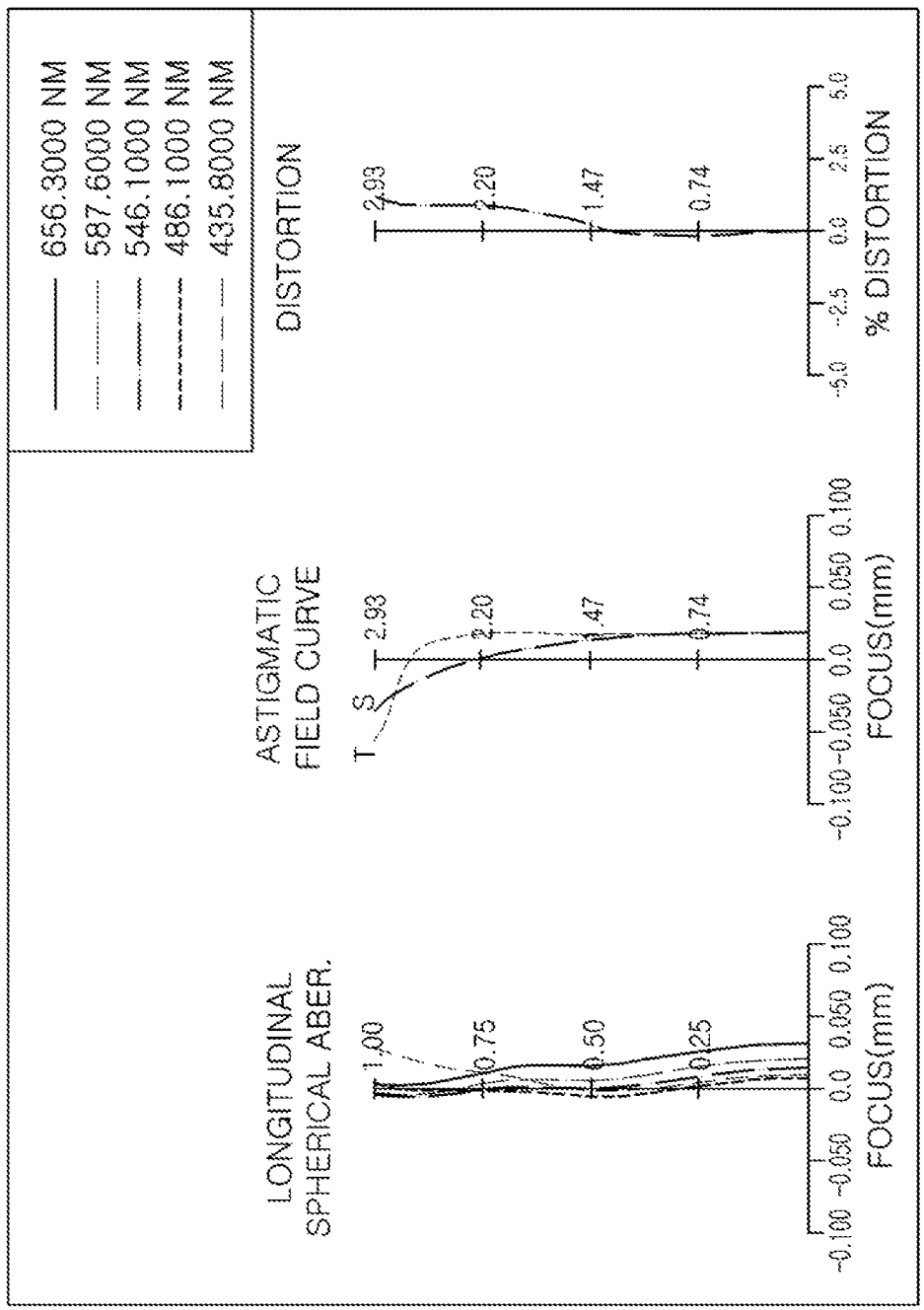
FIG. 2 illustrates graphs showing aberration curves of the optical imaging system illustrated in FIG. 1.

The optical imaging system 100, configured as described above, has aberration characteristics as illustrated in FIG. 2. FIG. 3 is a table listing characteristics of lenses of the optical imaging system 100 illustrated in FIG. 1. FIG. 4 is a table listing aspherical characteristics of the optical imaging system 100 illustrated in FIG. 1.

Figure 5:
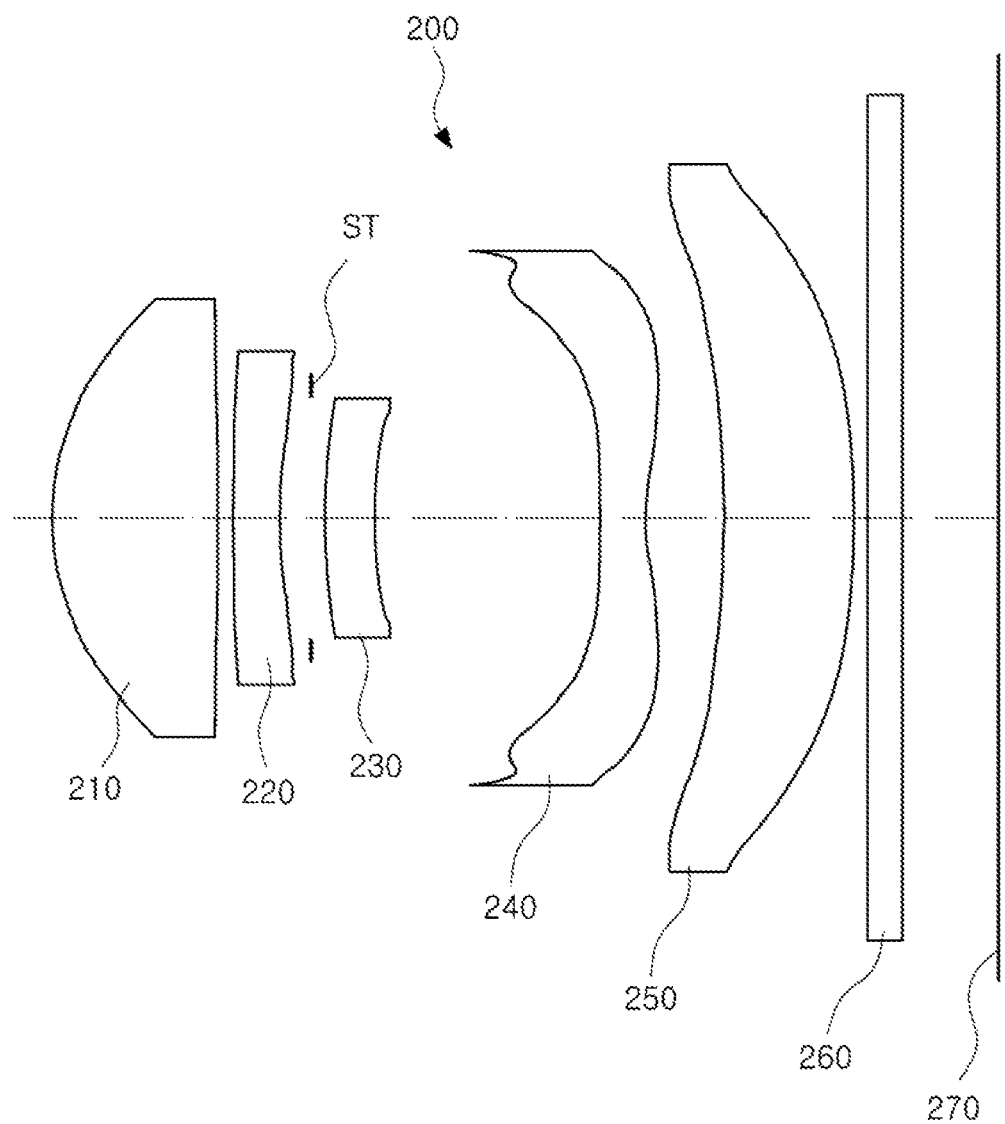
FIG. 5 is a view of an optical imaging system, according to a second example.

Referring to FIG. 5, an optical imaging system, according to a second example, is described.

An optical imaging system 200 includes a plurality of lenses having refractive power. For example, the optical imaging system 200 includes a first lens 210, a second lens 220, a third lens 230, a fourth lens 240, and a fifth lens 250.

In the second example, the first lens 210 has positive refractive power, and a convex object-side surface and a convex image-side surface. The second lens 220 has negative refractive power, and has a convex object-side surface and a concave image-side surface. The third lens 230 has negative refractive power, and a concave object-side surface and a concave image-side surface. The fourth lens 240 has negative refractive power, and a concave object-side surface and a concave image-side surface. In addition, inflection points are formed on the concave object-side surface and the concave image-side surface of the fourth lens 240. The fifth lens 250 has positive refractive power, and has a concave object-side surface and a convex image-side surface.

The optical imaging system 200 includes a stop ST, a filter 260, and an image sensor 270.

The stop ST is disposed between the second lens 220 and the third lens 230. The filter 260 is disposed between the fifth lens 250 and the image sensor 270.

Figure 6:
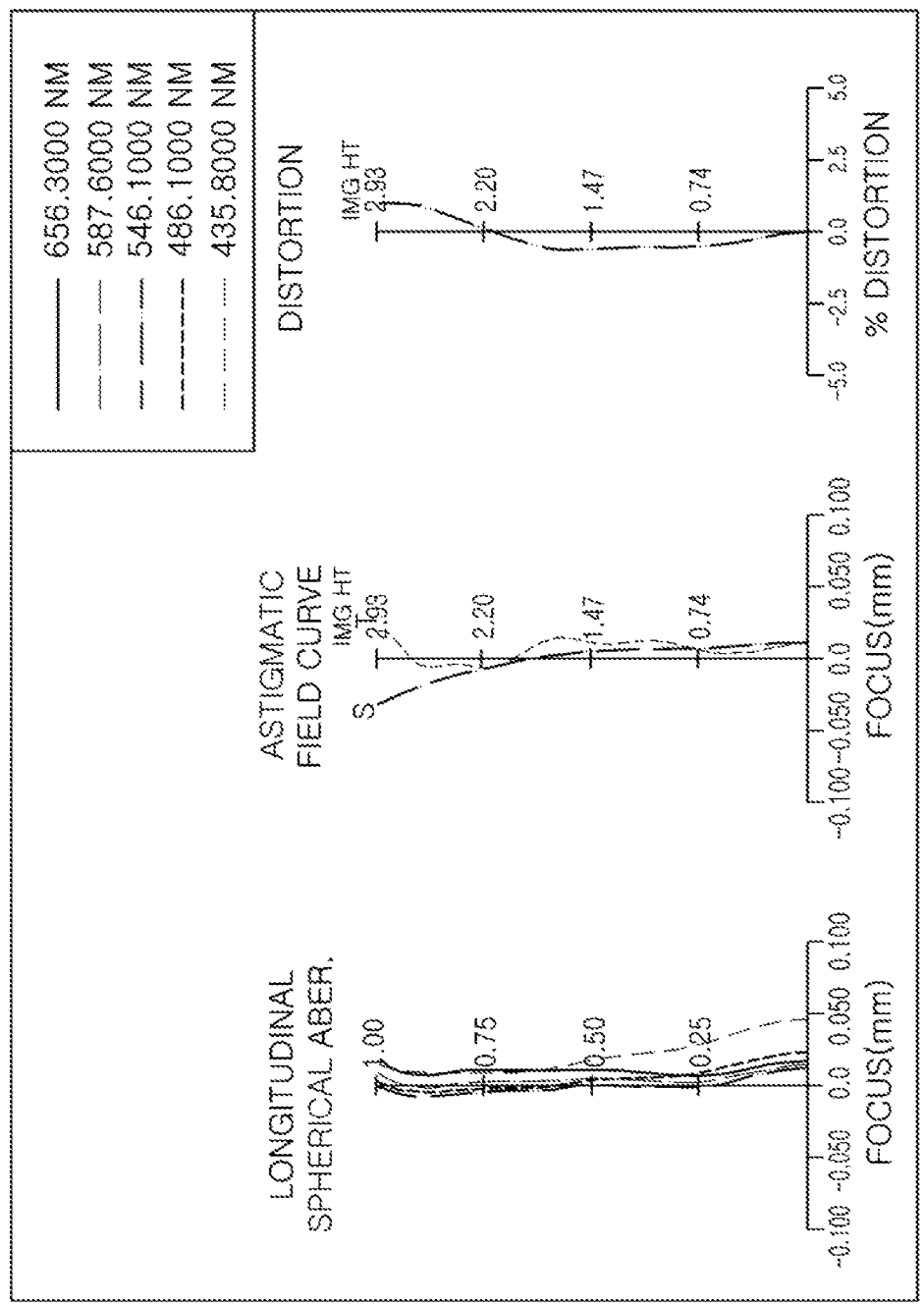
FIG. 6 illustrates graphs showing aberration curves of the optical imaging system illustrated in FIG. 5.

The optical imaging system 200, configured as described above, has aberration characteristics as illustrated in FIG. 6. FIG. 7 is a table listing characteristics of lenses of the optical imaging system 200 illustrated in FIG. 5. FIG. 8 is a table listing aspherical characteristics of the optical imaging system 200 illustrated in FIG. 5.

Figure 9:
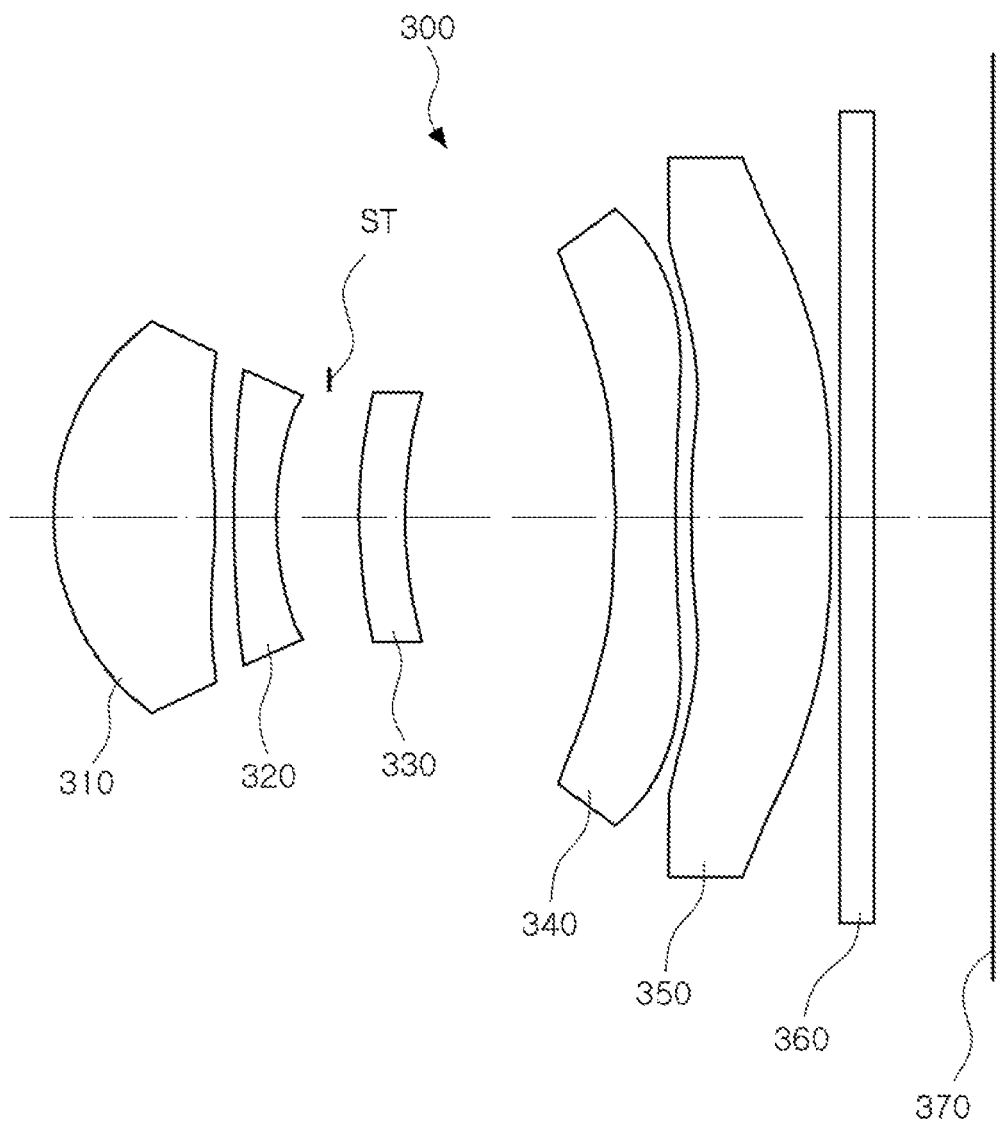
FIG. 9 is a view of an optical imaging system, according to a third example.

Referring to FIG. 9, an optical imaging system, according to a third example, is described.

An optical imaging system 300 includes a plurality of lenses having refractive power. For example, the optical imaging system 300 includes a first lens 310, a second lens 320, a third lens 330, a fourth lens 340, and a fifth lens 350.

In the third example, the first lens 310 has positive refractive power, and a convex object-side surface and a convex image-side surface. The second lens 320 has negative refractive power, and has a convex object-side surface and a concave image-side surface. The third lens 330 has negative refractive power, and has a convex object-side surface and a concave image-side surface. The fourth lens 340 has negative refractive power, and a concave object-side surface and a concave image-side surface. In addition, inflection points are formed on the concave object-side surface and the concave image-side surface of the fourth lens 340. The fifth lens 350 has positive refractive power, and has a convex object-side surface and a convex image-side surface.

The optical imaging system 300 includes a stop ST, a filter 360, and an image sensor 370.

The stop ST is disposed between the second lens 320 and the third lens 330. The filter 360 is disposed between the fifth lens 350 and the image sensor 370.

Figure 10:
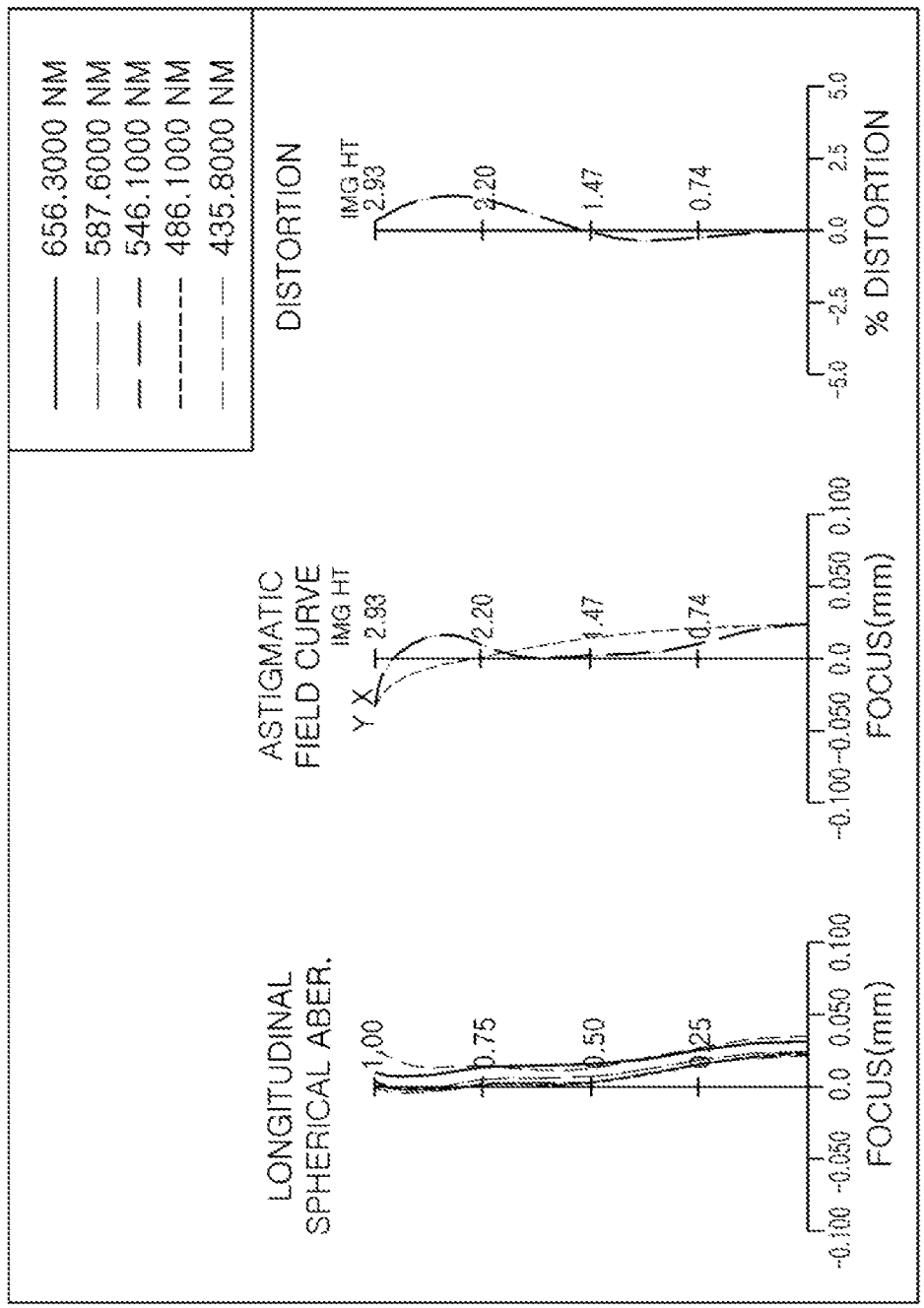
FIG. 10 illustrates graphs showing aberration curves of the optical imaging system illustrated in FIG. 9.

The optical imaging system 300 illustrated in FIG. 9, configured as described above, has aberration characteristics as illustrated in FIG. 10. FIG. 11 is a table listing characteristics of lenses of the optical imaging system 300 illustrated in FIG. 9. FIG. 12 is a table listing aspherical characteristics of the optical imaging system 300 illustrated in FIG. 9.

Table 1 below lists values obtained from Conditional Expressions 1 through 6 of the optical imaging systems, according to the first to third examples. As illustrated in Table 1, the optical imaging systems, according to the first to third examples, satisfy the numerical ranges defined as Conditional Expressions 1 through 6.

TABLE 1

| Conditional Expression | Example 1 | Example 2 | Example 3 |
|---|---|---|---|
| TL/F | 0.879 | 0.879 | 0.879 |
| R1/F | 0.225 | 0.253 | 0.233 |
| f/f2 | −1.239 | −0.931 | −1.571 |
| d34/TL | 0.279 | 0.238 | 0.222 |
| Nd5 | 1.651 | 1.651 | 1.651 |
| tan$\ominus$ | 0.431 | 0.431 | 0.431 |

Figure 13:
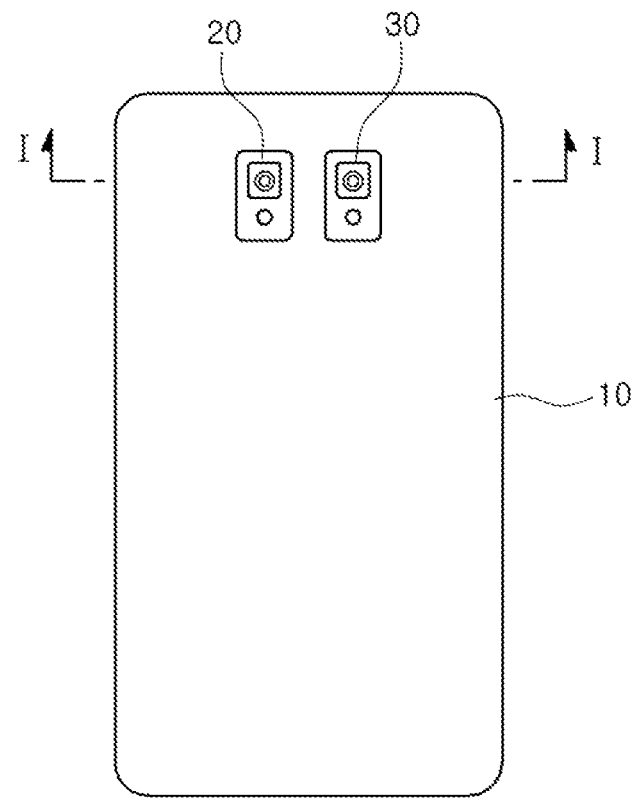
FIG. 13 is a rear view of a mobile terminal having an optical imaging system mounted therein, according to an example.
Figure 14:
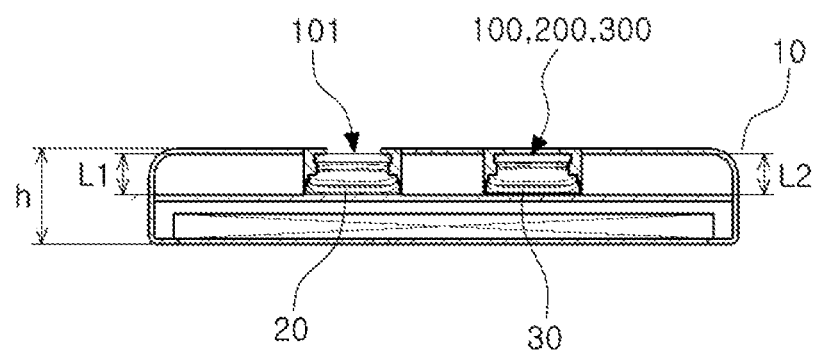
FIG. 14 is a cross-sectional view of the mobile terminal illustrated in FIG. 13.

Next, referring to FIGS. 13 and 14, a mobile terminal having an optical imaging system according to an example is described.

A mobile terminal 10 includes a first camera module 20 and a second camera module 30. The first camera module 20 includes a first optical imaging system 101 configured to capture an image of a subject at a close distance, and the second camera module 30 includes a second optical imaging system 100, 200, or 300 configured to capture an image of the subject at a long distance.

The first optical imaging system 101 includes a plurality of lenses. For example, the first optical imaging system 101 includes four or more lenses. The first optical imaging system 101 has a wide field of view. For example, the first optical imaging system 101 has a field of view of 50 degrees or higher.

The second optical imaging system 100, 200, or 300 includes a plurality of lenses. For example, the second optical imaging system 100, 200, or 300 includes five lenses. Furthermore, the second optical imaging system 100, 200, or 300 has one of the optical imaging systems according to the above-mentioned first to third examples. The second optical imaging system 100, 200, or 300 has a narrow field of view. For example, the second optical imaging system 100, 200, or 300 may have a field of view of 40 degrees or below.

The first optical imaging system 101 and the second optical imaging system 100, 200, or 300 have substantially the same size as each other. For example, an overall length L1 of the first optical imaging system 101 is substantially the same as an overall length L2 of the second optical imaging system 100, 200, or 300. Alternately, a ratio (L2/L1) of the overall length L2 of the second optical imaging system 100, 200, or 300 to the overall length L1 of the first optical imaging system 101 is from 0.8 to 1.0. Alternately, a ratio (L2/h) of the overall length L2 of the second optical imaging system 100, 200, or 300 to a height h of the mobile terminal 10 is equal to or less than 0.8.

As set forth above, according to the embodiments, an optical imaging system may be mounted in a small terminal.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
   a first lens comprising positive refractive power, a convex object-side surface, and a convex image-side surface;
   a second lens comprising negative refractive power, a convex object-side surface, and a concave image-side surface;
   a third lens comprising refractive power;
   a fourth lens comprising negative refractive power, a concave object-side surface, a concave image-side surface in a paraxial region, and an inflection point formed on an image-side surface thereof; and
   a fifth lens comprising positive refractive power, a concave object-side surface, and a convex image-side surface,
   wherein TL/f<1.0 is satisfied,
   in which TL is a distance from an object-side surface of the first lens to an imaging plane, and f is an overall focal length of the optical imaging system.

2. The optical imaging system of claim 1, wherein the third lens comprises a concave object-side surface.

3. The optical imaging system of claim 1, wherein the third lens comprises a convex object-side surface.

4. An optical imaging system, comprising:
   a first lens comprising positive refractive power and a convex object-side surface;
   a second lens comprising negative refractive power, a convex object-side surface, and a concave image-side surface;
   a third lens comprising refractive power, a convex object-side surface, and a concave image-side surface;
   a fourth lens comprising negative refractive power, a concave object-side surface, and a concave image-side surface; and
   a fifth lens comprising positive refractive power, a concave object-side surface in a paraxial region, and a convex image-side surface,
   wherein TL/f<1.0 is satisfied,
   in which TL is a distance from an object-side surface of the first lens to an imaging plane, and f is an overall focal length of the optical imaging system.

5. The optical imaging system of claim 4, wherein 0.15<R1/f<1.5 is satisfied,
   in which R1 is a radius of curvature of an object-side surface of the first lens, and f is an overall focal length of the optical imaging system.

6. The optical imaging system of claim 4, wherein −3.5<f/f2<−0.5 is satisfied,
   in which f is an overall focal length of the optical imaging system, and f2 is a focal length of the second lens.

7. The optical imaging system of claim 4, wherein 0.1<d34/TL<0.7 is satisfied,
   in which d34 is a distance from an image-side surface of the third lens to an object-side surface of the fourth lens, and TL is a distance from an object-side surface of the first lens to an imaging plane.

8. The optical imaging system of claim 4, wherein 1.60<Nd5<1.75 is satisfied,
   in which Nd5 is a refractive index of the fifth lens.

9. The optical imaging system of claim 4, wherein 0.3<tan θ<0.5 is satisfied,
   in which θ is equal to half a field of view of the optical imaging system.

* * * * *